United States Patent [19]
Schubert et al.

[11] 3,957,940
[45] May 18, 1976

[54] WRINKLE FREE EXTRUSION COATING OF HEAT FUSIBLE FOAM SHEET

[75] Inventors: John C. Schubert; Edward C. Le Duc, both of Chippewa Falls, Wis.

[73] Assignee: Standard Oil Company, Chicago, Ill.

[22] Filed: May 31, 1974

[21] Appl. No.: 475,171

Related U.S. Application Data

[63] Continuation of Ser. No. 312,953, Dec. 7, 1972, abandoned.

[52] U.S. Cl. .............................. 264/171; 156/244; 156/309; 156/324; 264/92; 264/174; 264/210 R; 264/321
[51] Int. Cl.² .......................................... B29F 3/10
[58] Field of Search ............... 264/210 R, 171, 174, 264/47, 321, 90, 92, 45.9, 46.1, 46.3; 156/244, 324, 309

[56] References Cited
UNITED STATES PATENTS

| | | |
|---|---|---|
| 3,039,911 | 6/1962 | Fox ........................................ 264/92 |
| 3,360,415 | 12/1967 | Hellman et al. ..................... 156/324 |
| 3,386,877 | 6/1968 | Skochdopole et al. .............. 264/321 |
| 3,398,224 | 8/1968 | Spencer ............................... 264/321 |
| 3,616,020 | 10/1971 | Whelan et al. ....................... 156/324 |
| 3,669,794 | 6/1972 | Mazur .................................. 156/244 |

*Primary Examiner*—Jeffery R. Thurlow
*Attorney, Agent, or Firm*—Stanley M. Welsh; Arthur G. Gilkes; William T. McClain

[57] ABSTRACT

In a process for extrusion coating of both sides of a foamed polystyrene sheet with a rubber modified polystyrene the specific improvement of crushing the coated foam sheet such that it will rebound to only 30 to 70 percent of its original thickness results in a product of improved processing characteristics. This crushed sheet can be thermally formed into a wrinkle free china-like surface useful in making insulated dishes, trays, food containers and the like.

10 Claims, 1 Drawing Figure

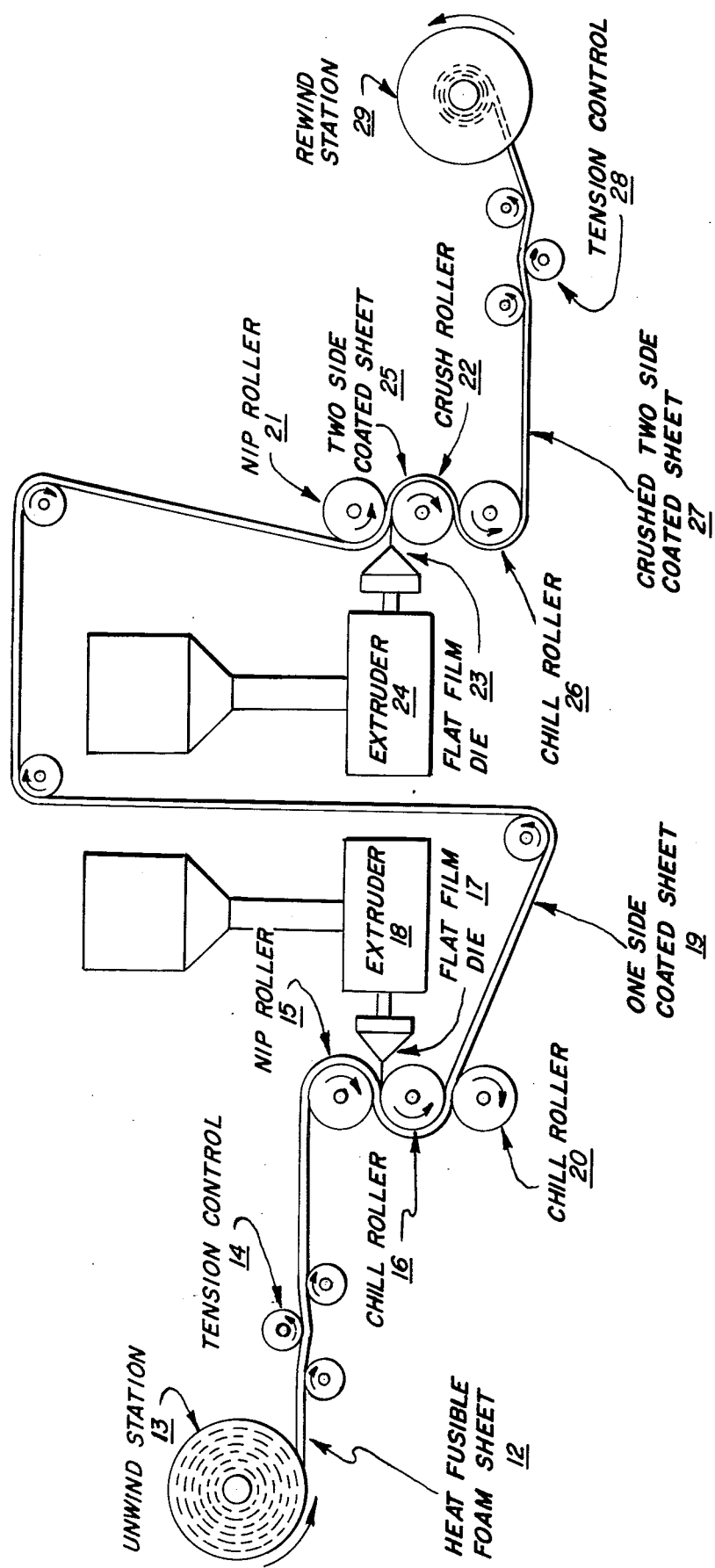

WRINKLE FREE EXTRUSION COATING OF HEAT FUSIBLE FOAM SHEET

BACKGROUND OF THE INVENTION

This is a continuation of application Ser. No. 312,953, filed Dec. 7, 1972, now abandoned.

The field of the invention relates to an improved method of extrusion coating and subsequent bonding of both sides of a heat fusible foam sheet with a resinous polymeric material. Recently, Whelan et al in U.S. Pat. No. 3,616,020 (1971) a process for continuously coating two sides of a heat fusible foam sheet was disclosed wherein limiting the amount of reverse wrap and controlling the linear tension were critical factors in maintaining the desired smooth surface. In order to avoid cracking of the coating and sheet and to reduce the presence of blemishes and wrinkle caused by passing of the coated sheet over rollers or multiplicity of rollers wherein the arc angle exceeded 90° (i.e., where the sheet changes direction of travel by more than 90°) the choice of minimum diameter of the roller involved was severly limited. This minimum diameter was found to be a function of the number of coated sides and thickness of the sheet. This functionality has conveniently been expressed in terms of a ratio wherein the diameter of the roller is divided by the thickness of the heat fusible foam sheet with both measurements being expressed in the same units. Thus prior to this invention, as taught in U.S. Pat. No. 3,616,020, this ratio of arc diameter to thickness could never be less than 180 for one-side coated sheet and 240 for two-side coated sheet. We have discovered that by crushing the two-side coated sheet such that it will remain in a compressed state representing from 40 to 60 percent of its normal thickness, the thickness it would have been if it were not crushed and hereafter referred to as the original thickness, the resulting coated sheet can traverse arc angles in excess of 90° with virtually no limitation as to the diameter of roller. Using this improvement ratios of arc diameter to thickness as low as 100 are routinely used in continuous high speed operations without loss of surface appearance or strength of the resulting products.

SUMMARY OF THE INVENTION

The invention is an improvement in the process for coating a heat fusible foam sheet with a polymeric resinous material. The improvement involves crushing the heat fusible foam sheet while coating the second side. This crushed sheet can be wound, unwound, and taken over the bends required in feeding a thermoforming machine without introducing wrinkles, cracks, or other surface blemishes as previously experienced. Furthermore, this can be accomplished without resorting to the use of the combination of high winding tension and large rollers as thought in the art. After thermoforming, the wrinkle-free product made from the crushed sheet will be about 90 percent as thick as a similar finished product not involving crushed sheet. This thickness usually is greater than the original coated sheet thickness because of the inherent expansion associated with thermal forming step. The final products made from crushed sheet exhibit virtually no loss of strength or insulating properties.

The prior art process upon which the invention of this application is an improvement is a continuous process for coating heat fusible foam sheet with a polymeric resinous material. The process includes heating the resinous material in an extruder, such extruder being any of those types in common use in the plastics industry, having a heating means and a compression means. Resinous polymeric material is melted in an extruder whereupon it is forced out of the barrel and through a flat film die under a pressure in the range of about 1,000 and 5,000 pounds per square inch. As used in the specification and claims the term melted means plasticized by heat until extrudable. The flat film die desirably has a gap or opening of from 2 to 100 thousandths of an inch and an effective width approximately equal to the width of the heat fusible foam sheet to be coated. The die can be provided with conventional heating means.

The molten resinous polymeric material is continuously extruded through the die and onto the heat fusible foam sheet which is moving past the die. The coated polystyrene foam is then compressed between two rollers, a nip roller and a chill roller. The nip roller and the chill roller are maintained at a temperature between 70° and 175°F, preferably at the higher temperature. The temperature of the rollers should be controlled so that the polymeric resinous material does not cool so much that it cannot melt a thin layer of the heat fusible foam sheet and fuse thereto. The clearance between these two rollers, which causes the polymeric resinous material and the heat fusible foam sheet to be compressed is commonly referred to as the nip. In the practice of this invention the nip pressure per linear inch must be adequate to press the coating into the foam substrate. Such a nip pressure is that generally sufficient to compress the coated foam sheet to about one-half its normal thickness. However, mechanical stops are used such that the foamed sheet is not compressed beyond its ability to elastically rebound. The foam, being resilient, regains a majority of the change in thickness caused by such compression. After compression the laminate is held in contact with the chill roller which cools it and which can also impart desirable surface characteristics to the polymeric resinous layer. For example, if a mirror surface is desired a highly polished chill roller should be used.

The crushing of the two-side coated foamed sheet can be done by any means known to the art and conveniently can be done in a manner similar to the aforementioned compressing step except that the mechanical stops at the nip are backed off and sufficient force is applied to the roller so as to exceed the elasticity of the foam. The resulting crushed foam will rebound to approximately half of its original thickness. This crushing step should be performed prior to the coated foam sheet being passed around a small diameter roller which could create the wrinkling effect.

DESCRIPTION OF THE DRAWING

The drawing shows a cross sectional view of the preferred mode of practice of the invention wherein two extruders are employed, each coating one side of the foamed sheet.

In this embodiment the heat fusible foam sheet 12 travels from an unwind station 13 through a series of three cylindrical rollers which serve as a tension control 14 and onto the first of three highly polished metallic cylindrical rollers indicated as nip roller 15. Nip roller 15 forms a nip or compression means with the second highly polished roller, chill roller 16. At this nip one side of the heat fusible foam sheet is coated with a polymeric resinous material extruded through a flat film die 17 attached to extruder 18. The one-side coated sheet 19 is then compressed by passing through a second nip formed by chill roller 16 and chill roller 20 and is transferred to nip roller 21 which is the first of a second set of three highly polished metallic cylindrical rollers. Nip roller 21 forms a nip and crushing means with the second highly polished roller, crush roller 22. The one-side coated sheet passed through this nip such that the uncoated surface is coated with the polymeric resinous material extruded through a flat film die 23 attached to extruder 24. At this point the two-side coated sheet 25 is crushed by passing through the nip formed by nip roller 21 and crushing roller 22. The crushed two-side coated sheet passes around chill roller 26 through a final series of three rollers which serve as a tension control 28 onto a rewind station 29 where the final wrinkle free product is recovered.

PREFERRED EMBODIMENTS

The preferred extruder has a barrel, a heating means and a compression means. The compression means of the extruder is an auger contained inside the barrel having from 18 to 30 flights (revolutions of the helical inclined plane along the length of the barrel). The heating means is either an electric or oil heater positioned outside and along the barrel to create independently controlled heat zones inside the barrel. Some heat is also provided by working of the material in the auger compression means. The barrel temperature should be between 400° and 475°F., the barrel having an inside diameter of between 1 and 12½ inches. The polymeric resinous material can thus be extruded in a continuous operation.

It is preferred that extrusion be through a heated flat film die. The temperature of the die is held between 375° and 500°F. by either an electric or an oil heater. The pressure inside the die will generally fall in the range of 1,000 to 5,000 p.s.i. depending upon the polymeric resinous material used. The die pressure is preferably 1,500 p.s.i. The gap (opening) in the die is approximately 2 to 100 thousandths of an inch, preferably 10 thousandths, with the width of the die varying with the width of the heat fusible foam sheet to be coated.

For best results it is important that the molten resinous coating material contact the heat fusible foam sheet while it is still on the nip roller. Contacting the two materials at this point insures that the resinous polymeric material will contact the foam sheet while it is being held smooth and free from wrinkles. Optionally the nip rollers can be rotated between 0 and 10 percent slower (based on the surface speed) than the middle chill rollers (16 and 22 of the drawing) and the second chill roller (20 of the drawing) can be rotated between 0 and 10 percent faster (based on surface speed) than the middle chill roller resulting in a more smooth and uniform product. It has been found that about 2 percent variance in speed (based on the surface speed) is the optimum. In addition, the tension on the heat fusible foam sheet is controlled by two tension controls (shown in the drawing). The preferred tension on the coated sheet coming off the rolls is between 2 and 20 pounds per linear inch.

The linear speed of the heat fusible foam sheet as it travels from the unwind station to the rewind station is dependent upon the thickness of the polymeric resinous material to be applied, the output of the polymeric resin extruder and the capabilities of the unwind station and the rewind station (shown in the drawing). Speeds can range from 10 to 200 feet per minute depending upon these variables.

Various heat fusible foam sheets can serve as the substrate in the coating process of this invention. The following are examples of the more important foams which can be coated: polystyrene, styrene copolymers, polyethylene, polypropyene and polyvinylchloride. It should be noted, however, that polyethylene and polypropylene foam sheets are only effective as substrates when they are being coated with polyethylene and polypropylene respectively. Similarly, polyethylene and polypropylene are only effective as coating materials when polyethylene and polypropylene foam sheets are the respective substrates.

The compression of the polymeric resinous material onto the heat fusible foam sheet substrate can be effected without nip compression by increasing the linear tension of the foam substrate, thereby causing the polymeric material to be compressed slightly as it is wrapped between the nip roll and the foam substrate. Suitable polymeric resinous materials are polystyrene, rubber modified polystyrene, polyethylene, polypropylene and polyvinylchloride, as well as copolymers of styrene such as acrylonitrile-butadiene-styrene, acrylonitrile-styrene, and maleic anhydride-styrene.

The preferred method of crushing the coated foam sheet is to pass the sheet between a pair of highly polished metallic rollers. This pair of rollers have all mechanical stops backed off such that they are free to almost come in contact with each other. A compressing force from 10 to 150 pounds per linear inch is applied inorder to crush the sheet. The nip pressure must be sufficient to crush the individual foam cells as indicated by the fact that the foam rebounds to only about one half of its original thickness. The final thickness of the sheet after crushing can range from 30 to 70 percent and preferably from 40 to 60 percent of the original dimension. The choice of pressure required is dependant on the composition of the foam sheet, the density of the sheet, the mass per unit area of the sheet, and the cell geometry. Generally a spherical cell structure is preferred. Foams deviating from a spherical cell geometry will require less pressure. In commercial production of foam polystrene sheet, nip pressures of 60 pounds per linear inch are used on spherical cell foam weighing 11 grams per 100 square inches and having a 4 pound per cubic foot extruded density.

The following example illustrates the preferred embodiment of our invention but should not be considered unduly limiting.

EXAMPLE

A 51 inch wide roll of foamed polystyrene sheet having an average density of 4.0 lbs/ft$^3$, an average mass per unit area of 11 grams/100 in$^2$, and thus a thickness of about 104 mils prior to processing was continuously coated by the preferred mode illustrated in the drawing. Both sides of the foamed sheet were extrusion coated with a 3 mil thick film of rubber modified impact polystyrene. The overall line was run at a speed corresponding to 60 linear feet of coated foamed sheet per minute. Upon passing through the nip formed by the second to last pair of highly polished rollers all mechanical stops were backed off and the coated film was crushed with a force of 60 pounds per linear inch. After crushing, the coated foamed sheet had an average thickness of about 40 mils but maintained essentially the same mass per unit area. The crushed coated foam sheet was subsequently processed into disposable serving trays by thermoforming. The finished article exhibited excellent surface appearance being free of wrinkles or blemishes, a thickness which was approximately 90 percent of what would have been expected if no crushing step had been used thus restoring the insulating property of the foamed sheet and virtually no loss of strength.

In this example the ratio of arc diameter to heat fusible foam sheet thickness dropped as low as 100 without any deleterious effect on the final product.

We claim:

1. A process for coating two sides of a heat fusible foam sheet with a resinous polymeric material compatibly heat fusible with said heat fusible sheet comprising: (1) melting the resinous polymeric material; (2) extruding the resinous polymeric material through at least one flat film die sequentially onto the first and then the second side of the heat fusible foam sheet wherein the contacted heat fusible foam sheet and said resinous polymeric material are crushed simultaneously with the second side being coated such that it rebounds to only 40 to 60 percent of its original thickness whereby a coated sheet is produced which does not give rise to wrinkles, cracks, or other surface blemishes when said coated sheet is passed around rollers that give rise to a change in direction of travel of said coated sheet of more than 90° and the ratio of the arc diameter of said roll to thickness of said coated sheet is as low as 100.

2. A process of claim 1 wherein the resinous polymeric material is acrylonitrile-butadiene-styrene, acrylonitrile-styrene, polyvinylchloride, polystyrene, styrene-maleic anhydride or rubber modified polystyrene.

3. A process of claim 1 wherein the heat fusible foam sheet is polystyrene, styrene copolymers or polyvinylchloride.

4. The process of claim 1 wherein the heat fusible foam sheet is polyethylene and the resinous polymeric material is polyethylene.

5. The process of claim 1 wherein the heat fusible foam sheet is polypropylene and the resinous polymeric material is polypropylene.

6. The process of claim 1 wherein the heat fusible foam sheet is polystyrene and the resinous polymeric material is rubber modified polystyrene.

7. The process of claim 6 wherein the coated foamed sheet is crushed by a pair of chill rollers.

8. The process of claim 6 wherein said crushed sheet is not damaged when subjected to a reverse wrap over a roll at a ratio of arc diameter to thickness as low as 100.

9. A process of claim 1 wherein said heat fusible foam sheet is a foamed polystyrene sheet coated on both sides with a film of rubber modified impact polystyrene.

10. A process for coating two sides of a heat fusible foam sheet with a resinous polymeric material compatibly heat fusible with said heat fusible sheet comprising the steps: (1) melting the resinous polymeric material; (2) extruding the resinous polymeric material through at least one flat film die sequentially onto the first then the second side of the heat fusible foam sheet; (3) crushing the coated foamed sheet simultaneously with said second side being such that it rebounds to only 40 to 60 percent of its original thickness; (4) continuously passing said crushed sheet over at least one roll with a reverse wrap at a ratio of arc diameter to thickness as low as 100; (5) recovering an undamaged crushed sheet capable of being thermoformed into a finished article.

* * * * *

UNITED STATES PATENT OFFICE
CERTIFICATE OF CORRECTION

Patent No. 3,957,940                           Dated May 18, 1976

Inventor(s) John C. Schubert and Edward C. LeDuc

It is certified that error appears in the above-identified patent and that said Letters Patent are hereby corrected as shown below:

Column 6, line 30, after "being" insert --coated--.

Signed and Sealed this

Twenty-seventh Day of July 1976

[SEAL]

Attest:

RUTH C. MASON
*Attesting Officer*

C. MARSHALL DANN
*Commissioner of Patents and Trademarks*